(12) United States Patent
Ulrey et al.

(10) Patent No.: US 8,731,789 B2
(45) Date of Patent: May 20, 2014

(54) TRANSMISSION FLUID HEATING VIA HEAT EXCHANGE WITH ENGINE CYLINDER WALLS

(75) Inventors: Joseph Norman Ulrey, Dearborn, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 12/892,548

(22) Filed: Sep. 28, 2010

(65) Prior Publication Data

US 2011/0172890 A1 Jul. 14, 2011

(51) Int. Cl.
- *G06F 7/00* (2006.01)
- *G06F 17/00* (2006.01)
- *G06F 19/00* (2011.01)

(52) U.S. Cl.
USPC ....... 701/54; 137/334; 137/340; 123/142.5 R; 184/104.1

(58) Field of Classification Search
USPC .............. 701/54, 58; 137/334, 340, 468, 479; 123/1 A, 196 R, 196 AB, 142.5 R; 165/916; 184/6.21, 6.22, 104.1
See application file for complete search history.

(56) References Cited

U.S. PATENT DOCUMENTS

| | | | |
|---|---|---|---|
| 2,898,896 A * | 8/1959 | McKinney | 123/41.33 |
| 4,858,825 A | 8/1989 | Kawamura | |
| 5,192,021 A | 3/1993 | Meier et al. | |
| 5,678,461 A | 10/1997 | Stine | |
| 5,960,872 A * | 10/1999 | Huemer et al. | 165/298 |
| 6,021,868 A | 2/2000 | Bogema | |
| 6,131,553 A | 10/2000 | Suzuki | |
| 6,360,702 B1 | 3/2002 | Osada | |
| 6,412,617 B1 | 7/2002 | Spijker et al. | |
| 6,427,640 B1 * | 8/2002 | Hickey et al. | 123/41.31 |
| 6,457,564 B1 * | 10/2002 | Damm et al. | 184/6.5 |
| 6,537,178 B1 | 3/2003 | Takizawa et al. | |
| 6,695,743 B2 | 2/2004 | Tanaka et al. | |
| 6,772,715 B2 * | 8/2004 | Pfeffinger et al. | 123/41.31 |
| 6,810,838 B1 * | 11/2004 | Hellman | 123/41.28 |
| 6,868,668 B2 | 3/2005 | Suzuki | |
| 7,147,071 B2 * | 12/2006 | Gering et al. | 237/12.3 B |
| 7,267,084 B2 * | 9/2007 | Lutze et al. | 123/41.02 |

(Continued)

FOREIGN PATENT DOCUMENTS

EP 0736703 * 10/1996 ............... F01M 5/00

OTHER PUBLICATIONS

Ulrey, Joseph Norman et al., "Method and System for Cabin Heating," U.S. Appl. No. 12/758,570, filed Apr. 12, 2010, 24 pages.

(Continued)

*Primary Examiner* — Khoi Tran
*Assistant Examiner* — Jaime Figueroa
(74) *Attorney, Agent, or Firm* — Julia Voutyras; Alleman Hall McCoy Russell & Tuttle LLP

(57) ABSTRACT

Various systems and method are provided for heating transmission fluid by directing the transmission fluid through a cylinder block of an engine. In one example, the transmission fluid is directed to flow through the cylinder block of the engine while engine coolant is directed to flow through the cylinder head of the engine. Further, the transmission fluid may be directed through one or more heat exchangers to cool the transmission fluid.

19 Claims, 6 Drawing Sheets

(56) References Cited

U.S. PATENT DOCUMENTS

| | | | |
|---|---|---|---|
| 7,334,543 B2* | 2/2008 | Pawellek | 123/41.1 |
| 7,644,793 B2* | 1/2010 | Iwasaki et al. | 180/68.2 |
| 7,735,461 B2* | 6/2010 | Vetrovec | 123/41.14 |
| 8,100,106 B2* | 1/2012 | Kardos et al. | 123/196 AB |
| 8,181,610 B2* | 5/2012 | Dipaola et al. | 123/41.1 |
| 2002/0050251 A1* | 5/2002 | Takahashi et al. | 123/41.1 |
| 2003/0116105 A1* | 6/2003 | Pfeffinger et al. | 123/41.31 |
| 2004/0007403 A1* | 1/2004 | Tomatsuri et al. | 180/65.2 |
| 2005/0145706 A1* | 7/2005 | Cardinali Ieda | 236/93 R |
| 2006/0157000 A1* | 7/2006 | Lutze et al. | 123/41.02 |
| 2006/0216166 A1* | 9/2006 | Pawellek | 417/371 |
| 2007/0295475 A1 | 12/2007 | Samie et al. | |
| 2008/0216777 A1* | 9/2008 | Vetrovec | 123/41.29 |
| 2009/0205590 A1* | 8/2009 | Vetrovec | 123/41.14 |
| 2010/0000475 A1 | 1/2010 | Kardos et al. | |
| 2010/0197441 A1 | 8/2010 | Pursifull | |

OTHER PUBLICATIONS

Ulrey, Joseph Norman et al., "Vehicle Fuel Burner," U.S. Appl. No. 13/035,688, filed Feb. 25, 2011, 25 pages.

* cited by examiner

TRANSMISSION FLUID HEATING VIA HEAT EXCHANGE WITH ENGINE CYLINDER WALLS

TECHNICAL FIELD

The present application relates to heating a powertrain and, more specifically, to heating transmission fluid via heat from cylinder walls of an engine.

BACKGROUND AND SUMMARY

Under cold start conditions, a powertrain has cooled to ambient conditions, which may be relatively hot or cold, and each component of the powertrain (e.g., engine, transmission, etc.) warms-up to a desired operating temperature. It is desirable for the powertrain to warm-up as quickly as possible, as the powertrain operates with increased fuel economy when it is up to operating temperature. Further, it has been shown that, of the various powertrain fluids (e.g., engine coolant, transmission fluid, engine oil, etc.) heating transmission fluid returns the largest fuel economy benefit.

In some examples, the transmission fluid is heated via heat exchange with engine coolant which is circulated through a cylinder head of the engine. In such an example, the transmission fluid is heated after the engine coolant is heated. In other examples, the transmission fluid may exchange heat with air, including via a radiator, and the transmission fluid may only be heated if the radiator is running hot.

The inventors herein have recognized the above issue and have devised an approach to at least partially address it. Thus, a method for lubricating a transmission with transmission fluid, the transmission coupled to an engine in a vehicle is disclosed. The method comprises directing the transmission fluid through a cylinder block adjacent to a cylinder wall, and, under a first condition, directing the transmission fluid to a heat exchanger and, under a second condition, bypassing the heat exchanger.

Thus, by directing the transmission fluid to flow through the cylinder block adjacent to the cylinder walls, the transmission fluid may be heated as soon as engine waste heat is generated thereby increasing fuel economy during a cold start, for example. In addition, engine coolant may flow through the cylinder head while transmission fluid flows through the cylinder walls and the cylinder block may remain at a higher temperature than the cylinder head, while reducing requirements to transfer fluid between the head and the block. Further, by controlling the flow of the transmission fluid to a heat exchanger, the temperature of the transmission fluid may be regulated such that it does not get too hot.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
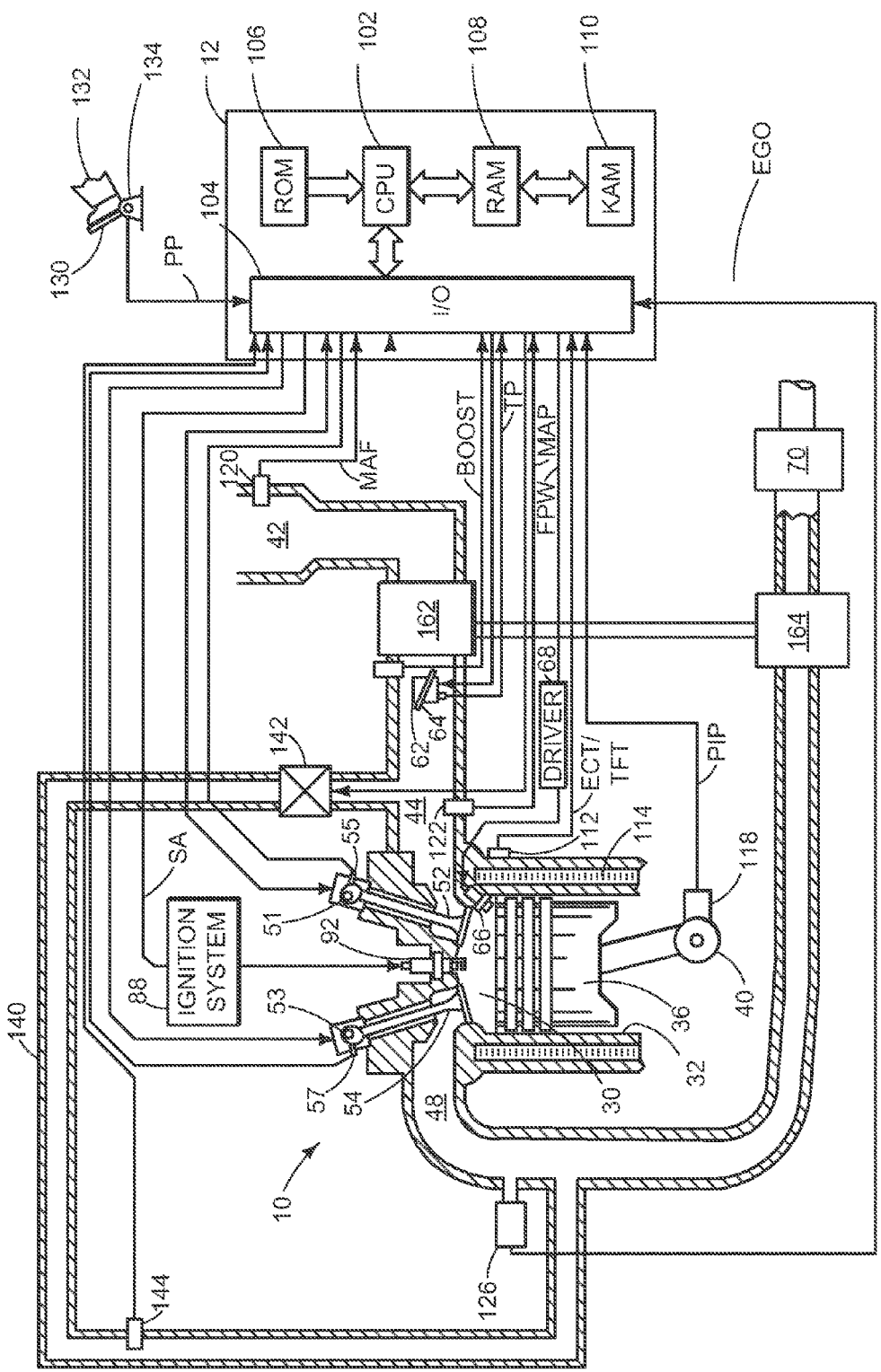
FIG. 1 shows a schematic diagram of an engine.
Figure 2:
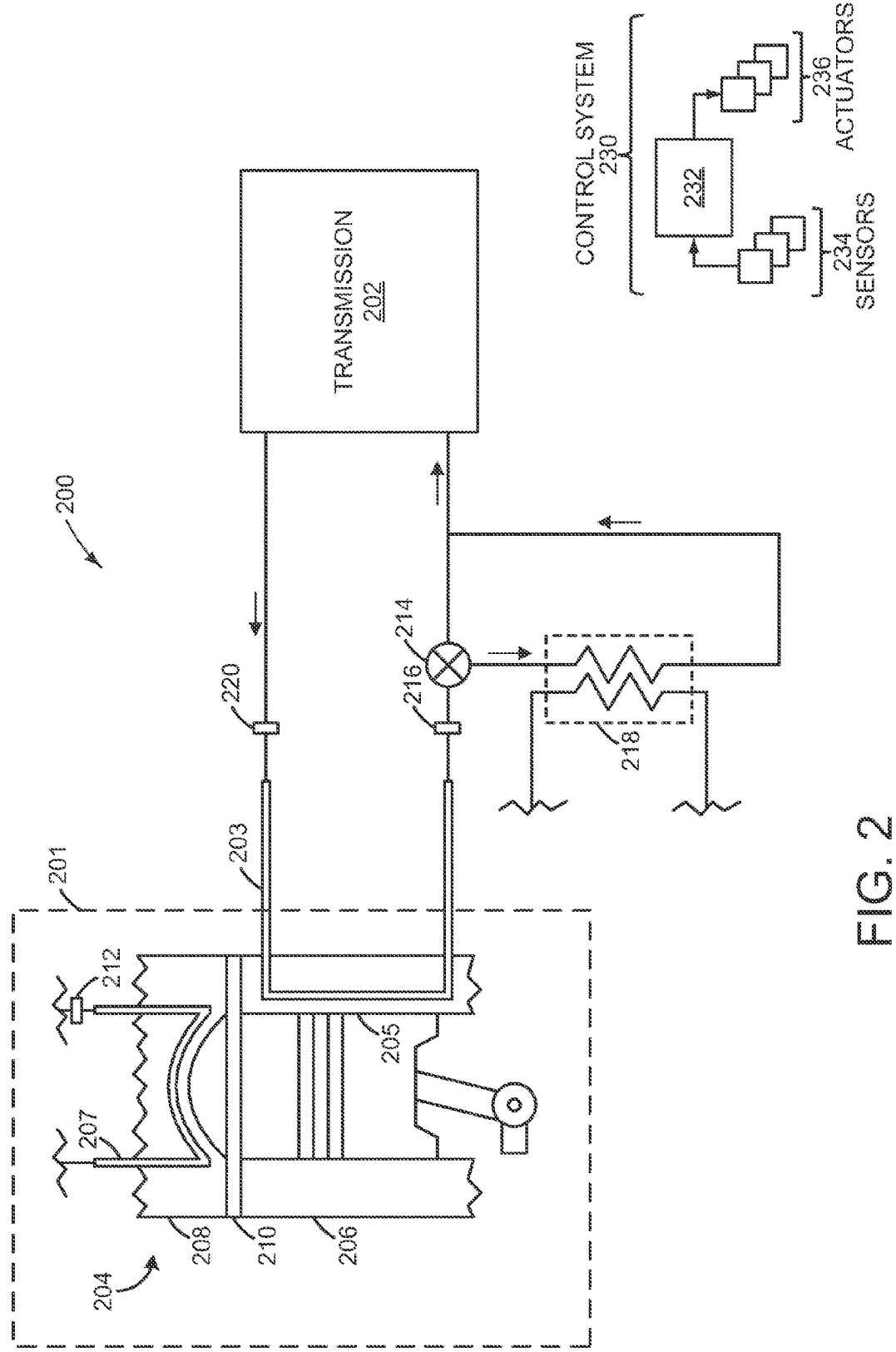
FIG. 2 shows an example embodiment of a powertrain system which includes transmission fluid flowing through cylinder walls.
Figure 3:
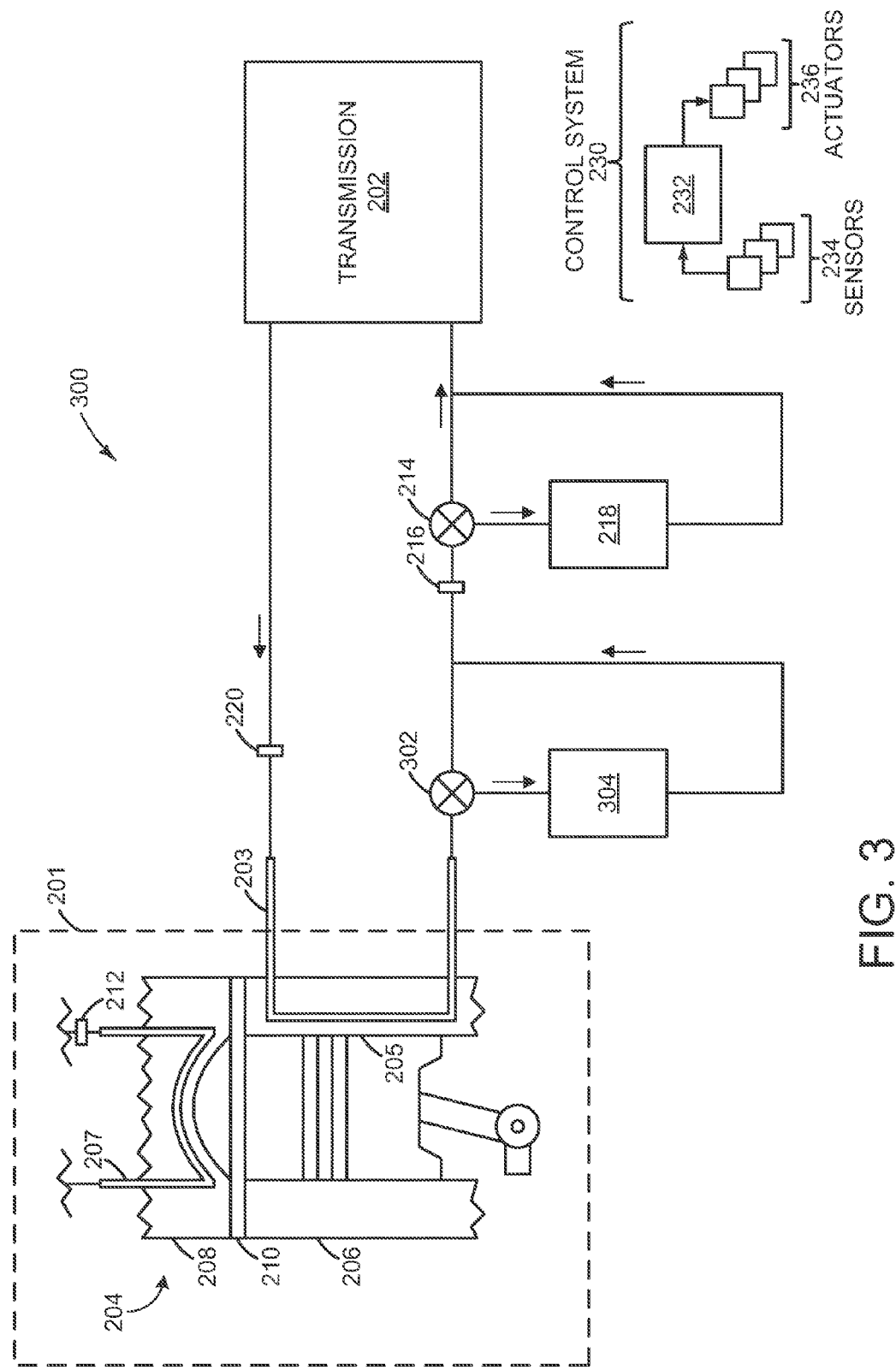
FIG. 3 shows another example embodiment of a powertrain system which includes transmission fluid flowing through cylinder walls.
Figure 4:
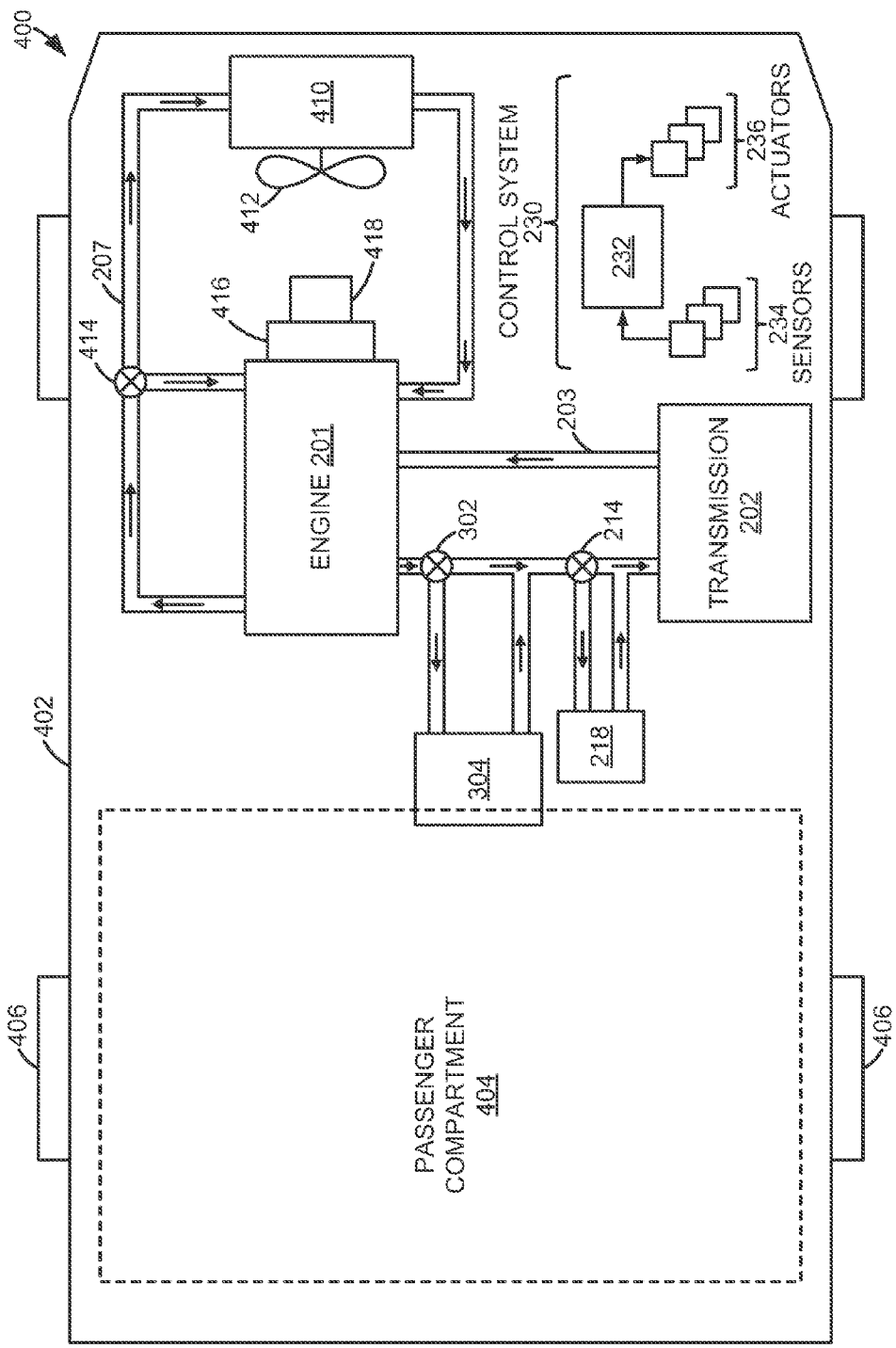
FIG. 4 shows an example embodiment of a powertrain system in a motor vehicle.

The following description relates to systems and methods for heating transmission fluid (e.g., transmission oil) by directing the transmission fluid to flow through cylinder walls of an engine in a motor vehicle. The cylinder may be part of internal combustion engine as shown in FIG. 1. By routing transmission fluid through the cylinder, as shown in FIGS. 2-4, waste heat from combustion occurring in the cylinders of the engine may be transferred to the transmission fluid while waste heat may further be transmitted to engine coolant that is flowing through a cylinder head of the engine. In this manner, transmission fluid heating occurs as soon as engine waste heat is generated, and further, the cylinder block is maintained at a higher temperature than the cylinder head, for example. As shown in FIGS. 2 and 3, the transmission fluid may flow through a heat exchanger coupled between the engine and transmission. In some embodiments, the transmission may additionally (FIG. 3) or alternatively (FIG. 4) flow through a heater core in order to heat a passenger compartment of the vehicle. In this manner, the transmission fluid may be cooled such that the transmission is not overheated, for example. An engine controller may be configured to perform control routines, such as the routines depicted in FIGS. 5 and 6, for directing the flow of the transmission fluid and adjusting engine operating parameters accordingly.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Further, in the disclosed embodiments, an exhaust gas recirculation (EGR) system may route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Engine 10 may further include a compression device such as a turbocharger or supercharger including at least a compressor 162 arranged along intake manifold 44. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) or transmission fluid temperature (TFT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and each cylinder may similarly include its own set of intake/exhaust valves, fuel injector, spark plug, etc.

Continuing to FIG. 2, it shows an example embodiment of a powertrain system 200 which includes a transmission 202 coupled to an engine 201 with transmission fluid flowing through the walls 205 of a cylinder 204 in a cylinder block 206, such as cylinder 30 of engine 10 described above with reference to FIG. 1, which may be one cylinder of a multi-cylinder engine.

In the embodiment illustrated in FIG. 2, coolant flows through a cylinder head 208 of cylinder 204 via a coolant line 207. Coolant may flow through the cylinder head 208 and then may be directed to a radiator, for example, where the coolant is cooled via a heat exchange with air. A temperature of the coolant may be measured via a temperature sensor 212.

Transmission fluid such as transmission oil which lubricates the transmission 202 (and/or performs as conventional automatic transmission fluid) is directed to flow from transmission 202 to cylinder block 206 adjacent to the cylinder wall 205 via a transmission fluid line 203. In such a configuration, heat from combustion occurring in the cylinder 204 may be transferred to the transmission fluid 203. As such, the transmission fluid is heated as it flows through the cylinder block 206.

As shown in the embodiment of FIG. 2, there is no fluid flow (e.g., engine coolant or transmission fluid) through a head gasket 210 interposed between the cylinder block 206 and the cylinder head 208. In such a configuration, the fluids are maintained separately between the cylinder head and the cylinder block thereby reducing leaks that may occur near the head gasket due to degradation of parts, for example. In other examples, however, there may be some exchange of fluids through the head gasket (e.g., coolant, transmission fluid, or another engine lubricant).

After passing through the cylinder block 206 (and increasing in temperature), the transmission fluid flows to a valve 214. Valve 214 may be a thermostat, for example, which only allows the transmission fluid to be directed to a particular location when it is greater than a predetermined threshold temperature, as will be described in greater detail below. A temperature of the transmission fluid may be measured by temperature sensor 216, for example, after it flows through the cylinder block 206 and before it reaches valve 214. Control system 230 may include controller 232, such as controller 12 described above with reference to FIG. 1, that is in communication with a plurality of sensors 234 (e.g., temperature sensors 212, 216, and 220) and actuators 236 (e.g., valve 214). As such, the control system 230 may control valves, such as valve 214, based on measured temperatures of the engine coolant and transmission fluid, for example.

In the embodiment illustrated in FIG. 2, transmission fluid flowing through valve 214 may be directed back to the transmission 202 or to a heat exchanger 218. In some embodiments, heat exchanger 218 may exchange heat with ambient air, for example. In other embodiments, heat exchanger 218 may exchange heat with the engine coolant. Further, is other embodiments, the heat exchange with air or coolant may occur after the transmission fluid leaves the transmission and before the transmission fluid enters cylinder block, for example.

FIG. 3 shows another example embodiment of a powertrain system 300 which includes a transmission coupled to an engine with transmission fluid flowing through the cylinder walls. In the example of FIG. 3, the powertrain system 300 includes an additional heat exchanger 304. The embodiment shown in FIG. 3 has many similar parts to the embodiment shown in FIG. 2; as such, like reference characters will be used to indicate like parts and those parts will not be described in detail again.

As shown in the example embodiment of FIG. 3, transmission fluid that has exited the cylinder block 206 reaches valve 302 before valve 214. Based on an operating condition, as will be described in greater detail below, the controller 232 of control system 203 may send a signal to one of actuators 236 coupled to the valve 302 to adjust the valve to direct the flow of the transmission fluid to heat exchanger 304. Heat exchanger 304 may be a part of a heater core which provides heat to a cabin of the vehicle, for example. In other examples, the heat may be used to warm the fuel or fuel additive such as water/ice, the heat may be used to warm engine oil, the heat may be used to warm engine (head) coolant, the heat may be used to warm traction batteries, or the heat may be used to warm fuel cells, for example.

Although not shown, the transmission fluid has a transmission fluid pump that may be an auxiliary electric pump which is part of transmission 202. As such, the transmission fluid pump can operate while the engine is off. Thus, in stop/start vehicles such as hybrid vehicles, the transmission fluid pump can operate when the engine is off (e.g., at idle speeds) thereby maintaining a heat supply to the passenger cabin if desired.

FIG. 4 shows an example embodiment of a powertrain system, such as powertrain system 300, in a motor vehicle 400. In the powertrain system of FIG. 4, transmission fluid which lubricates transmission 202 exchanges heat with a cylinder block in an engine 402 and a heater core 304 in communication with a passenger compartment 404 of the motor vehicle 400. The embodiment shown in FIG. 4 has many similar parts to the embodiments shown in FIGS. 2 and 3; as such, like reference characters will be used to indicate like parts and those parts will not be described in detail again.

As illustrated in the example embodiment of FIG. 4, vehicle 402 has drive wheels 406, a passenger compartment 404 (herein also referred to as a cabin), and an engine compartment including an internal combustion engine 201, such as engine 10 described above with reference to FIG. 1.

Like the examples described above, coolant circulates via a coolant line 207 through internal combustion engine 201 to absorb waste engine heat and distribute the heated coolant to radiator 410. In some embodiments, coolant line 207 may further circulate coolant to the heater core 304 to heat the cabin 404. A temperature of the coolant may be regulated by a thermostat valve 414, located in coolant line 207, which may be kept closed until the coolant reaches a threshold temperature. For example, thermostat 414 may be kept closed such that no coolant flows to the radiator 410 until a temperature of the coolant rises above a threshold temperature.

Further, a fan 412 may be coupled to radiator 410 in order to maintain an airflow through the radiator 410 when vehicle 402 is moving slowly or stopped while the engine is running. In some examples, fan speed may be controlled by a controller 232. Alternatively, fan 412 may be coupled to engine-driven water pump 416.

Engine-driven water pump 416 may be coupled to the engine via front end accessory drive (FEAD) 418, and rotated in proportion with engine speed via a belt, chain, etc. Specifically, engine-driven pump 416 circulates coolant through passages in the cylinder head of engine 201 to absorb engine heat, which is then transferred via the radiator 410 to ambient air. In one example, where pump 416 is a centrifugal pump, the pressure (and resulting flow) produced may be proportional to the crankshaft speed, which in the example of FIG. 4, is directly proportional to engine speed.

Transmission fluid may flow through transmission fluid line 203, as described above, and to heater core 304 where the heat may be transferred to passenger compartment 404, and the transmission fluid flows back to transmission 202 or through a second heat exchanger which exchanges heat with air or coolant, for example, as described above. Heater core 304 may thus act as a heat exchanger between the transmission fluid and the passenger compartment 404. Fins may be attached to the heater core 304 to increase the surface area for heat transfer. Air may be forced past the fins, for example by operating a fan, to expedite heating of the passenger compartment.

As noted herein, the amount of waste heat generated by the engine and transferred to the transmission fluid may affect the amount of heat that may be transferred to the passenger compartment to provide cabin heating. For example, during engine idling conditions, the amount of waste heat generated may be proportionally reduced, thereby reducing an amount of cabin heating available. Further, during such conditions, cabin heating may be substantially slow. In some examples, during vehicle idling conditions, with a gear selector in Park or Neutral positions, in response to a request for cabin heating and/or in response to a passenger compartment temperature falling below a threshold, the controller may be configured to perform a transmission grounding routine. Specifically, the controller may be configured to lock transmission output while increasing engine input to thereby selectively increase an amount of waste idle heat that is generated, and circulate the waste heat through the cabin heating system via transmission fluid. In this way, by generating waste heat during vehicle idling, fluid heating may be expedited, thereby enabling rapid cabin heating.

Further, once the engine is warmed-up transmission fluid may be routed to heat exchanger 218 via valve 214 where heat may be exchanged with air, for example, to cool the transmission fluid before it enters the transmission 202. In some examples, valve 214 may be actuated to direct transmission fluid to the heat exchanger 218 based on a temperature of the transmission fluid or a temperature of the transmission. For example, if one or both temperatures are greater than respective threshold temperatures, the transmission fluid is directed to the heat exchanger 218 for cooling.

Figure 5:
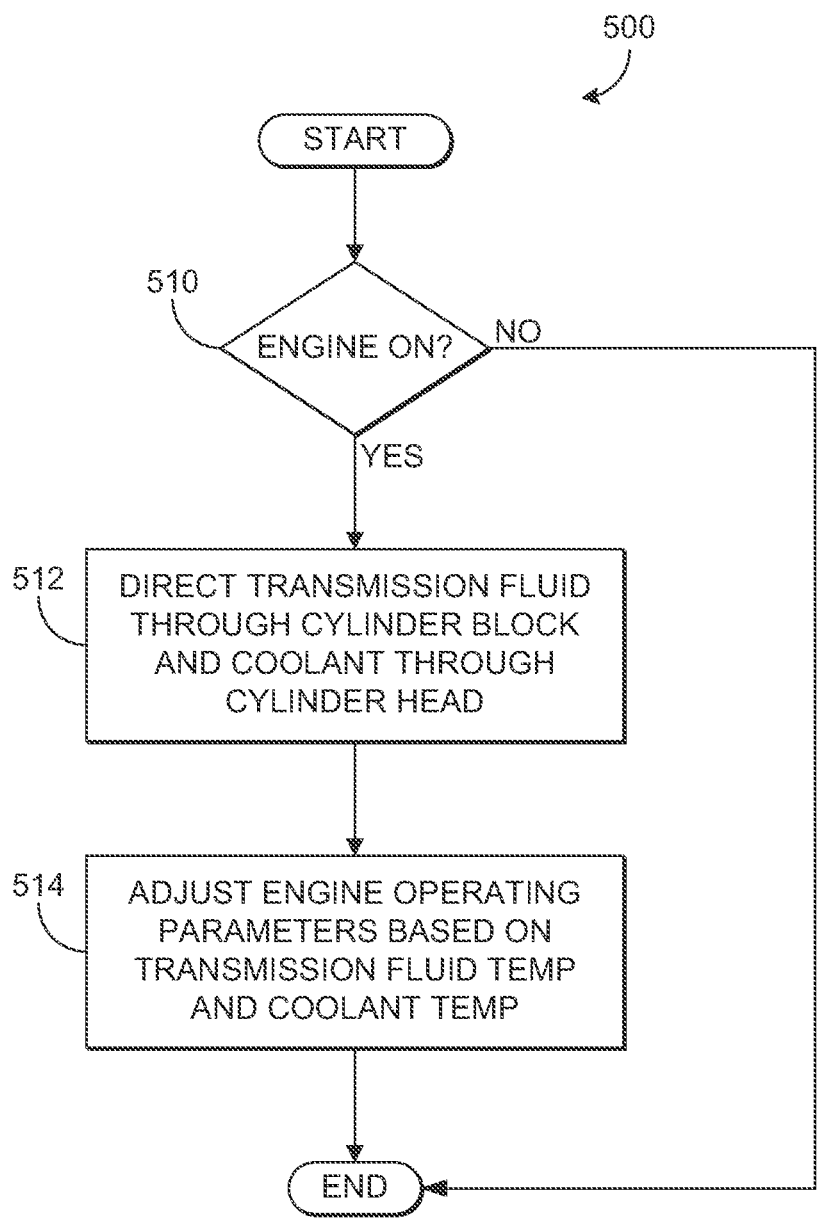
FIG. 5 shows a high level flow chart illustrating an engine control routine.

Continuing to FIG. 5, it shows a high level flow chart illustrating an engine control routine 500 for a powertrain such as a powertrain described above in which transmission fluid that lubricates a transmission is circulated through a cylinder block of an engine while coolant is circulated through a cylinder head of the engine.

At 510 of routine 500, it is determined if the engine is on. For example, it may be determined that an engine on if a key is turned to the "on" position in the ignition and the engine is turning. If it is determined that the engine is not on, routine 500 ends. On the other hand, if it is determined that the engine is on, routine 500 continues to 512 where transmission fluid is directed through the cylinder block and coolant is directed through the cylinder head. As described above, transmission fluid that circulates through the cylinder block is heated via waste heat from the combustion occurring in the cylinders, and coolant that circulates through the cylinder head is heated similarly.

Once the transmission fluid and coolant begin circulating through the engine, one or more engine operating parameters are adjusted based on temperatures of the transmission fluid and the coolant at 514 of routine 500. For example, in order for engine operation to be carried out in a manner such that fuel economy and/or reduced emission are maintained, various engine operating parameters are adjusted based on engine temperature indicated by one or more temperature sensors in the vicinity of the engine (e.g., engine coolant temperature and transmission fluid temperature). In one example, spark timing may be adjusted based on the temperatures of the transmission fluid and the engine coolant. As another example, valve timing may be adjusted based on the temperatures of the transmission fluid and the engine coolant. In other examples, one or more of the following may be adjusted in addition to sparking timing and/or valve timing: fuel injection timing and amount, boost, amount of EGR, etc.

Figure 6:
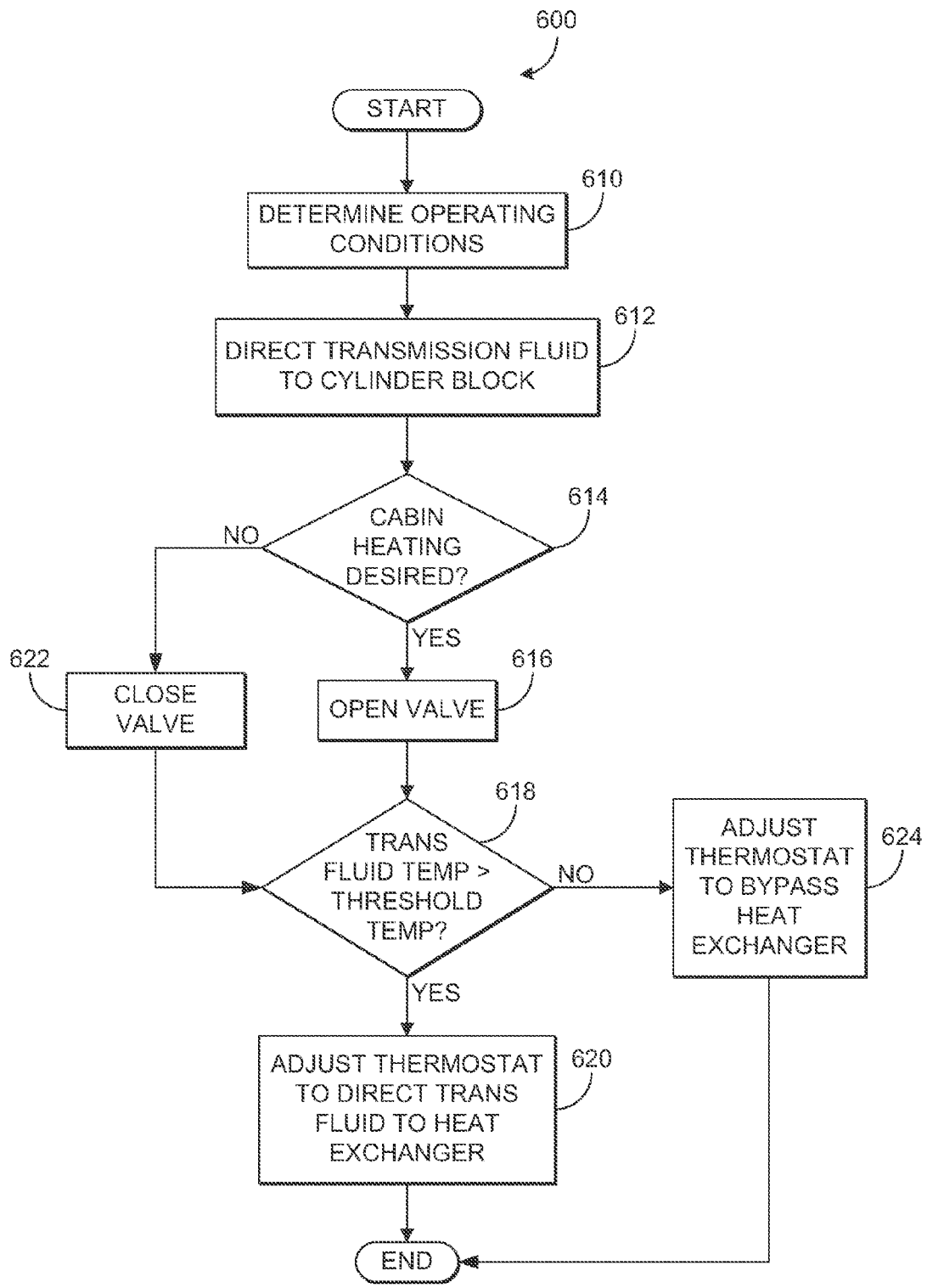
FIG. 6 shows a flow chart illustrating a routine for directing a flow of transmission fluid.

FIG. 6 shows a flow chart illustrating a routine 600 for directing a flow of transmission fluid through a powertrain. Specifically, routine 600 directs the flow of the transmission fluid between the transmission and the engine based on temperature of the transmission fluid.

At 610 of routine 600, operating conditions are determined. Operating conditions may include cabin temperature, coolant temperature, transmission temperature, etc.

Once the operating conditions are determined, routine 600 continues to 612 were transmission fluid is directed to flow through the cylinder block. As described above, transmission fluid flows through the cylinder block while engine coolant flows through the cylinder head. As such, waste heat from the engine may be transferred to both the engine coolant and the transmission fluid.

At 614 of routine 600, it is determined if cabin heating is desired. For example, when the ambient temperature is relatively cold, a passenger in the cabin may turn up the heat in the cabin which may send a signal to the controller that heat is desired in the cabin. If heat is not desired in the vehicle cabin, routine 600 moves to 622 and a valve (e.g., valve 302 in FIGS. 3 and 4) is closed such that after exiting the cylinder block, the heated transmission fluid bypasses a heater core and routine 500 proceeds to 618.

On the other hand, if heat is desired in the vehicle cabin, routine 600 proceeds to 618 where it is determined if a temperature of the transmission fluid is greater than a threshold temperature. The threshold temperature of the transmission fluid may be a temperature of transmission fluid that is too hot flow through the transmission, for example. In other examples, the threshold temperature may be based, at least in part, on an ambient temperature in the environment in which the vehicle is located and/or temperature of the transmission.

If it is determined that the transmission fluid temperature is not greater than the threshold temperature, routine 600 moves to 624 and the thermostat is adjusted to bypass the heat exchanger. As described above, if the temperature of the transmission fluid is too low, for example, during a cold start, cooling of the transmission fluid via the heat exchanger (e.g., exchanging heat with air or coolant, for example) may not be desirable, as heating of the transmission components may be needed and routing the transmission fluid through the heat exchanger may cool the transmission fluid too much.

In contrast, if it is determined that the temperature of the transmission fluid is greater than the threshold temperature, routine 600 continues to 620 and the thermostat is adjusted to direct the transmission fluid to flow through the heat exchanger before flowing back to the transmission. As such, the temperature of the transmission fluid may be decreased via the heat exchange with air or coolant.

In this way, transmission fluid may be routed to flow through a cylinder block of the engine in order heat the transmission fluid relatively quickly during a cold engine start thereby increasing fuel economy during a cold start, for example. Furthermore, by regulating the flow of the transmission through one or more valves, the temperature of the transmission may be regulated and a vehicle cabin may be heated.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for lubricating a transmission with transmission fluid, the transmission coupled to a vehicle engine, comprising:
   directing the transmission fluid through a cylinder block adjacent to a cylinder wall while flowing engine coolant through a cylinder head, without fluid flowing through a head gasket interposed between the cylinder head and the cylinder block;
   under a first condition, directing the transmission fluid to a heat exchanger; and
   under a second condition, bypassing the heat exchanger.

2. The method of claim 1, wherein the first condition includes transmission fluid temperature above a threshold temperature.

3. The method of claim 1, wherein the second condition includes transmission fluid temperature below a threshold temperature.

4. The method of claim 1, wherein the heat exchanger exchanges heat between the transmission fluid and ambient air.

5. The method of claim 1, wherein the heat exchanger exchanges heat between the transmission fluid and the engine coolant.

6. The method of claim 1, further comprising adjusting an engine operating parameter based on transmission fluid temperature and engine coolant temperature.

7. The method of claim 6, wherein the engine operating parameter includes at least one of injection timing, spark timing, and valve timing.

8. A method for lubricating a transmission with transmission fluid, the transmission coupled to a vehicle engine, comprising:
   directing a flow of transmission fluid through a cylinder block adjacent a cylinder wall and maintained separate from a flow of engine coolant directed only through a cylinder head of the engine; and
   adjusting a first valve to direct the transmission fluid to flow through a heat exchanger before flowing through the transmission based on an operating condition.

9. The method of claim 8, wherein the first valve is a thermostat and the transmission fluid flows through the heat exchanger when a temperature of the transmission fluid is greater than a threshold temperature.

10. The method of claim 8, wherein heat exchange within the heat exchanger occurs between the transmission fluid and ambient air.

11. The method of claim 8, further comprising adjusting a second valve to direct the transmission fluid to a heater core based on temperature in a cabin of a vehicle.

12. The method of claim 11, wherein the second valve is opened when the temperature of the cabin is less than desired.

13. The method of claim 8, further comprising adjusting an engine operating parameter based on a temperature of the transmission fluid and a temperature of the engine coolant.

14. The method of claim 13, wherein the engine operating parameter includes at least one of spark timing, injection timing, and valve timing.

15. The method of claim 8, wherein there is no fluid flow through a head gasket interposed between the cylinder block and cylinder head.

16. A system for an engine in a vehicle, comprising:
   a cylinder block and a cylinder head with a head gasket interposed therebetween;
   a transmission lubricated by transmission fluid;
   a thermostat;
   a heat exchanger;
   a control system comprising a computer readable storage medium, the medium comprising instructions for:
      directing the transmission fluid through the cylinder block and adjacent a cylinder wall, and directing a flow of engine coolant through the cylinder head, with no fluid flow through the head gasket interposed between the cylinder block and cylinder head; and
      under a first condition, directing the transmission fluid via the thermostat to the heat exchanger; and
      under a second condition, bypassing the heat exchanger via the thermostat.

17. The system of claim 16, wherein the first condition includes a temperature of the transmission fluid above a threshold temperature, and the second condition includes the temperature of the transmission fluid below the threshold temperature.

18. The system of claim 16, further comprising instructions for adjusting a valve to direct the transmission fluid from the cylinder block to a heater core before directing the transmission fluid to the transmission, and wherein a transmission fluid pump is an auxiliary electric pump that continues to direct transmission fluid to the heater core when passenger cabin heating is desired and the engine is off while the vehicle is on in a hybrid vehicle.

19. The system of claim 16, further comprising adjusting at least one of spark timing, ignition timing, and valve timing based on a temperature of the transmission fluid and a temperature of the engine coolant.

* * * * *